(12) United States Patent
Jang et al.

(10) Patent No.: US 12,273,061 B2
(45) Date of Patent: Apr. 8, 2025

(54) APPARATUS AND METHOD FOR PROTECTING VEHICLE DOOR SYSTEMS FROM BACK ELECTROMOTIVE FORCE (EMF) VOLTAGE

(71) Applicant: RIVIAN IP HOLDINGS, LLC, Irvine, CA (US)

(72) Inventors: James Jang, Irvine, CA (US); Kyle Lobo, Westchester, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 113 days.

(21) Appl. No.: 17/828,977

(22) Filed: May 31, 2022

(65) Prior Publication Data

US 2023/0085770 A1 Mar. 23, 2023

Related U.S. Application Data

(60) Provisional application No. 63/247,696, filed on Sep. 23, 2021.

(51) Int. Cl.
*H02P 6/22* (2006.01)
*E05F 15/60* (2015.01)
*H02P 6/26* (2016.01)
*H02P 29/028* (2016.01)

(52) U.S. Cl.
CPC ............ *H02P 29/028* (2013.01); *E05F 15/60* (2015.01); *E05Y 2201/434* (2013.01); *E05Y 2400/512* (2013.01); *E05Y 2800/404* (2013.01); *E05Y 2900/548* (2013.01)

(58) Field of Classification Search
CPC .................................... H02P 7/04; H02P 1/22
See application file for complete search history.

(56) References Cited

U.S. PATENT DOCUMENTS

| | | | |
|---|---|---|---|
| 9,397,604 B2* | 7/2016 | Oakley | H02P 29/0241 |
| 2014/0054339 A1* | 2/2014 | Smith | B60P 3/14 224/404 |
| 2019/0017311 A1* | 1/2019 | McGettrick | E05F 15/697 |

* cited by examiner

*Primary Examiner* — Kawing Chan
*Assistant Examiner* — Charles S Laughlin
(74) *Attorney, Agent, or Firm* — Haley Guiliano LLP

(57) ABSTRACT

Systems and methods are provided for protecting a door system from damage by a back electromotive force (EMF) voltage generated when a door coupled to a door actuator is manually closed. The door system may include a driver configured to drive the door actuator to move the door, and a back EMF protection circuit. The back EMF protection circuit detects a back EMF voltage generated by the door actuator when the door is moved, and determines whether the back EMF voltage exceeds an overvoltage threshold. In response to determining that the back EMF voltage exceeds the overvoltage threshold, the back EMF protection circuit causes the driver to transition to an enabled state to short the back EMF voltage to ground.

19 Claims, 6 Drawing Sheets

APPARATUS AND METHOD FOR PROTECTING VEHICLE DOOR SYSTEMS FROM BACK ELECTROMOTIVE FORCE (EMF) VOLTAGE

CROSS-REFERENCE TO RELATED APPLICATION

This application claims priority to U.S. Provisional Patent Application No. 63/247,696, filed on Sep. 23, 2021, the entire contents of which are hereby expressly incorporated by reference herein in their entirety.

INTRODUCTION

Automatic vehicle doors (e.g., doors that are able to be automatically opened and closed by the operation of an electric motor) improve user convenience. However, if a user manually opens or closes an automatic vehicle door when a vehicle is in an off state or a standby state, the electric motor (e.g., door actuator) may generate a large counter or back electromotive force (EMF) voltage that may damage the control system of the vehicle door.

SUMMARY

In some approaches, a passive component (e.g., a diode) may be included in the control system of the vehicle door to protect against damage from back EMF voltages. However, such passive components are large and require a large amount of physical space in the control system (e.g., on a printed circuit board (PCB) of the control system). Consequently, what is needed are techniques for protecting a control system of an automatic vehicle door from back EMF voltages that are generated when a user manually closes the automatic vehicle door, without requiring a large amount of physical space in the control system.

To solve one or more of these problems, systems and methods are provided for transitioning a driver of an actuator for a door from a disabled to an enabled state, when a back EMF voltage, which is generated by the door actuator when the door is moved, exceeds an overvoltage threshold. By transitioning the driver from the disabled to the enabled state, a protection circuit of the driver may operate to short the back EMF voltage to ground, and damage to the door control system may be avoided.

In some embodiments, the driver may be a half-bridge integrated circuit (IC) including a high-side switch and a low-side switch. The driver may be configured, when in the enabled state, to short the back EMF voltage at an output of the driver to ground through the low-side switch.

In some embodiments, the driver may be configured to short the back EMF voltage at the output of the driver to ground through the low-side switch, by switching on the low-side switch and switching off the high-side switch.

In some embodiments, the driver may include a protection circuit configured to: determine, when the driver is in the enabled state, whether the back EMF voltage exceeds a driver overvoltage level; and in response to determining that the back EMF voltage exceeds a driver overvoltage level, to short the back EMF voltage at the output of the driver to ground through the low-side switch, by switching on the low-side switch and switching off the high-side switch.

In some embodiments, the back EMF protection circuit may be configured, when causing the driver to transition to the enabled state, to transition an inhibit (INH) pin of the half-bridge IC from low to high.

In some embodiments, the system may further include a body control module including a PCB, wherein the half-bridge IC and the back EMF protection circuit are installed on the PCB.

In some embodiments, the driver may be a first driver configured to drive the door actuator to open the door. The system may further include a second driver configured to drive the door actuator to close the door. The back EMF protection circuit may be configured, when causing the driver to transition to the enabled state, to cause both the first driver and the second driver to transition to the enabled state.

In some embodiments, the door may be installed on a "frunk" of a vehicle (i.e., a trunk located at the front of a vehicle). The back EMF voltage may be generated by the door actuator when the door to the frunk is opened or closed.

In some embodiments, the back EMF protection circuit may include a comparator configured to compare the back EMF voltage with the overvoltage threshold and output a comparison result signal to a first transistor. When the back EMF voltage exceeds the overvoltage threshold, the comparison result signal may cause the first transistor to turn on and transition an INH pin of the driver from low to high to cause the driver to transition to the enabled state.

In some embodiments, a method is provided. The method includes detecting a back electromotive force (EMF) voltage that is generated by movement of a door actuator coupled to a vehicle door; determining whether the back EMF voltage exceeds an overvoltage threshold; and causing, in response to determining that the back EMF voltage exceeds the overvoltage threshold, a transition of a driver associated with the door actuator from a disabled state to an enabled state. The enabled state of the driver causes the back EMF voltage to short to ground.

In some embodiments, a vehicle is provided. The vehicle includes a vehicle body including an enclosure, a driver, and a back EMF protection unit. The door is coupled to the vehicle body and configured to provide access to the enclosure. The driver is configured to drive a door actuator to move the door. The back EMF protection circuit is configured to detect a back EMF voltage generated by the door actuator when the door is moved; determine whether the back EMF voltage exceeds an overvoltage threshold; and in response to determining that the back EMF voltage exceeds the overvoltage threshold, cause the driver to transition to an enabled state to short the back EMF voltage to ground.

In some embodiments, the enclosure may be a frunk.

In some embodiments, the driver may be a half-bridge IC including a high-side switch and a low-side switch. The driver may be further configured, when in the enabled state, to short the back EMF voltage at an output of the driver to ground through the low-side switch.

In some embodiments, the driver may be configured to short the back EMF voltage at the output of the driver to ground through the low-side switch, by switching on the low-side switch and switching off the high-side switch.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
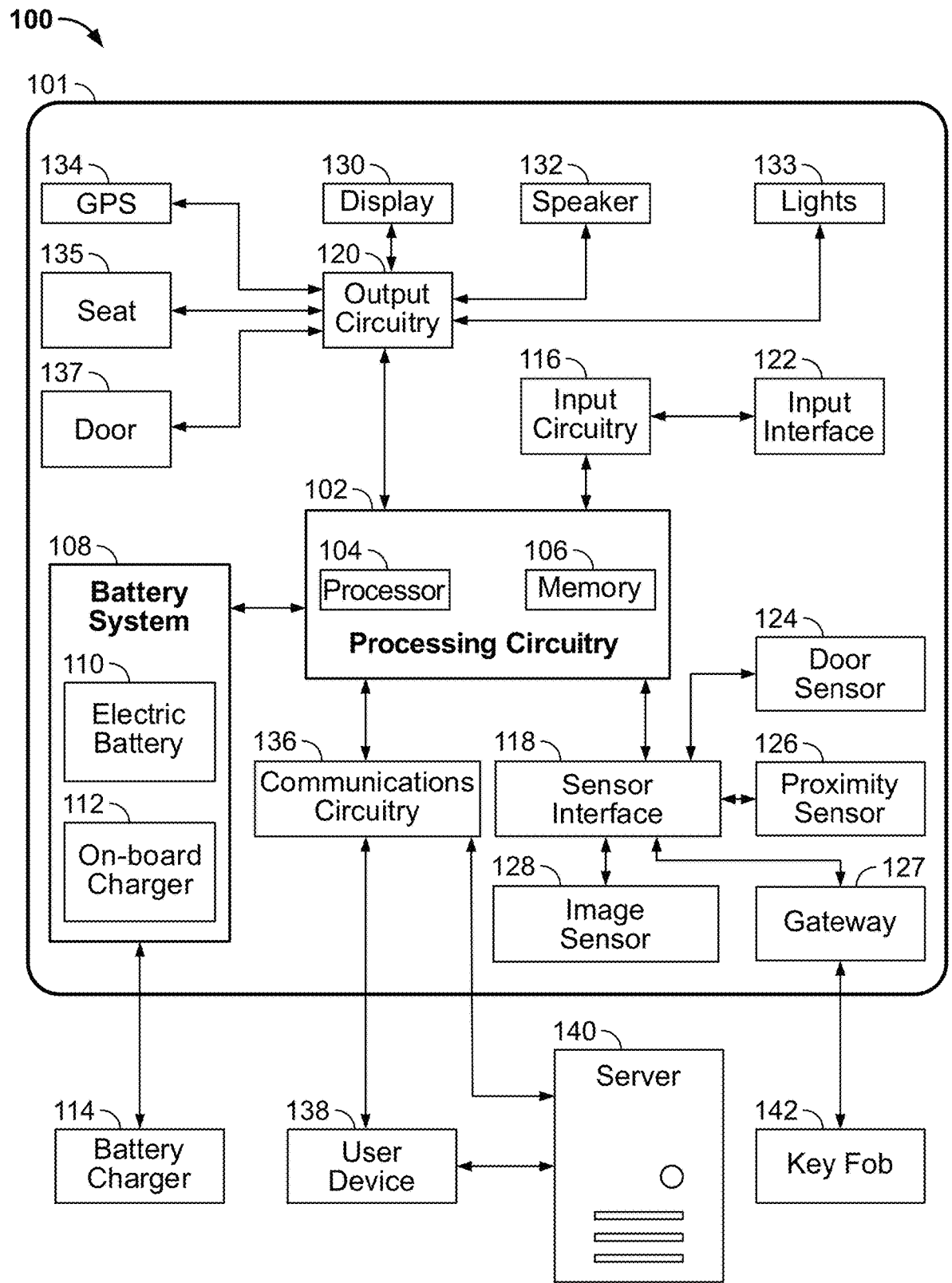
FIG. 1 shows a block diagram of components of a system of a vehicle including one or more powered doors, in accordance with some embodiments of the present disclosure.

FIG. 1 shows a block diagram of components of a system 100 of vehicle 101 (e.g., an electric vehicle) including one or more powered doors (e.g., door 137), in accordance with some embodiments of the present disclosure. Vehicle 101 may be a car (e.g., a coupe, a sedan, a truck, an SUV, a bus), a motorcycle, an aircraft (e.g., a drone), a watercraft (e.g., a boat), or any other type of vehicle. As explained in further detail below, system 100 may include a protection system for providing protection to an automatic door system that is capable of automatically opening and closing door 137, which provides access to an enclosure of vehicle 101 (e.g., a door to a frunk of the vehicle 101), from back EMF voltages generated by a user (e.g., the driver) manually closing door 137. Additionally, although an automatic door to a vehicle is described (e.g., door 137), door 137 may be any door operated by an electric motor (e.g., an actuator) that, when manually closed (e.g., quickly) by a user, generates large EMF voltages that may damage a control system of door 137.

Vehicle 101 may comprise processing circuitry 102, which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection.

Processing circuitry 102 may be communicatively connected to battery system 108, which may be configured to provide power to one or more of the components of vehicle 101 during operation. In some embodiments, vehicle 101 may be an electric vehicle or a hybrid electric vehicle. Battery system 108 may comprise electric battery 110, which may include one or more battery modules. Battery system 108 may further comprise on-board charger 112 to manage the flow of electricity to electric battery 110 (e.g., to perform AC-DC conversion when battery charger 114 is an AC charger), and any other suitable components. In some embodiments, on-board charger 112 may include connectors for interfacing with battery charger 114. Battery system 108 may be configured to manage charging of electric battery 110. Battery system 108 may include, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter).

Battery charger 114 may be coupled to a power source, e.g., a power transmission grid, a solar panel, a generator, a wind turbine, or another vehicle, and may be configured to provide charging current at a suitable charging voltage to electric battery 110 of vehicle 101. In some embodiments, battery charger 114 may correspond to a charger at a DC station (e.g., DC fast electric charging station) or AC station. Battery charger 114 may be, for example, a fixed charging station (e.g., a charging station installed in a public location or in a user's home), or a portable charger (e.g., a charger connected to a portable generator, a portable solar panel, or another vehicle). In some embodiments, battery charger 114 may be capable of charging electric battery 110 at one or more voltages, with one or more current limitations. For example, battery charger 114 may receive information from battery system 108 indicating what voltage, current, or both vehicle 101 may be charged with. In some embodiments, battery charger 114 and on-board charger 112 support both the inflow and outflow of current from electric battery 110 via a coupling. For example, during vehicle-to-vehicle charging or vehicle-to-grid power supply, battery charger 114 and/or on-board charger 112 may direct power from electric battery 110 to a power source coupled to battery charger 114, such as a battery of another vehicle or an electric power grid.

Image sensor 128 (e.g., a camera) may be communicatively coupled to processing circuitry 102 (e.g., by way of sensor interface 118) and positioned at any suitable position in an interior or exterior of vehicle 101. In some embodiments, image sensor 128 may capture images of destinations traveled to by vehicle 101 to identify driving habits of vehicle 101. Processing circuitry 102 may be communicatively connected to input interface 122 (e.g., a steering wheel, a touchscreen display, buttons, knobs, a microphone or other audio capture device, etc.) via input circuitry 116. In some embodiments, a driver of vehicle 101 may be permitted to select certain settings in connection with the operation of vehicle 101 (e.g., input a range selection, etc.). In some embodiments, processing circuitry 102 may be communicatively connected to Global Positioning System (GPS) system 134 of vehicle 101, where the driver may interact with the GPS system via input interface 122. GPS system 134 may be in communication with multiple satellites to ascertain the vehicle's location and provide navigation directions to processing circuitry 102. As another example, the positioning device may operate on terrestrial signals, such as cell phone signals, Wi-Fi signals, or ultra-wideband signals, to determine a location of vehicle 101.

Processing circuitry 102 may be communicatively connected to display 130, speaker 132, lights 133, seat 135, and door 137 by way of output circuitry 120. In some embodiments, door 137 may be an automatic door, as described in greater detail with reference to FIG. 2. Display 130 may be located at a dashboard of vehicle 101 and/or a heads-up display at a windshield of vehicle 101. For example, an interface for GPS system 134 or an interface of an infotainment system may be generated for display, and display 130 may comprise an LCD display, an OLED display, an LED display, or any other type of display. In some embodiments, display 130 may provide a driver with a navigation interface, an entertainment interface, a backup camera interface, etc. Speaker 132 may be located at any location within the cabin of vehicle 101, e.g., at the dashboard of vehicle 101, or on an interior portion of the vehicle door. Lights 133 may be interior or exterior lights that provide light from inside or outside of vehicle 101.

Processing circuitry 102 may be communicatively connected (e.g., by way of sensor interface 118) to door sensor 124 (e.g., which may sense an open door of vehicle 101), proximity sensor 126 (e.g., which may determine the distance separating a device (e.g., key fob 142) and vehicle 101), and gateway 127 (e.g., which may be configured to receive signals from a key fob associated with vehicle 101 (e.g., key fob 142).

In some embodiments, processing circuitry 102 may be in communication (e.g., via communications circuitry 136) with user device 138 (e.g., a mobile device, a computer, key fob 142, etc.). Such connection may be wired or wireless. In one example, such a connection is a two-way connection via the Bluetooth Low Energy (BLE) standard. In some embodiments, user device 138 may execute instructions stored in memory to run a vehicle interface application, e.g., to provide information related to vehicle 101. In some embodiments, communications circuitry and/or user device 138 may be in communication with one or more servers 140 (e.g., over a communications network such as, for example, the Internet). In some embodiments, the user may use the user device 138 to automatically open or close door 137.

It should be appreciated that FIG. 1 only shows some of the components of vehicle 101, and it will be understood that vehicle 101 also includes other elements commonly found in vehicles (e.g., electric vehicles), e.g., a motor, brakes, wheels, wheel controls, turn signals, windows, doors, etc.

Figure 2:
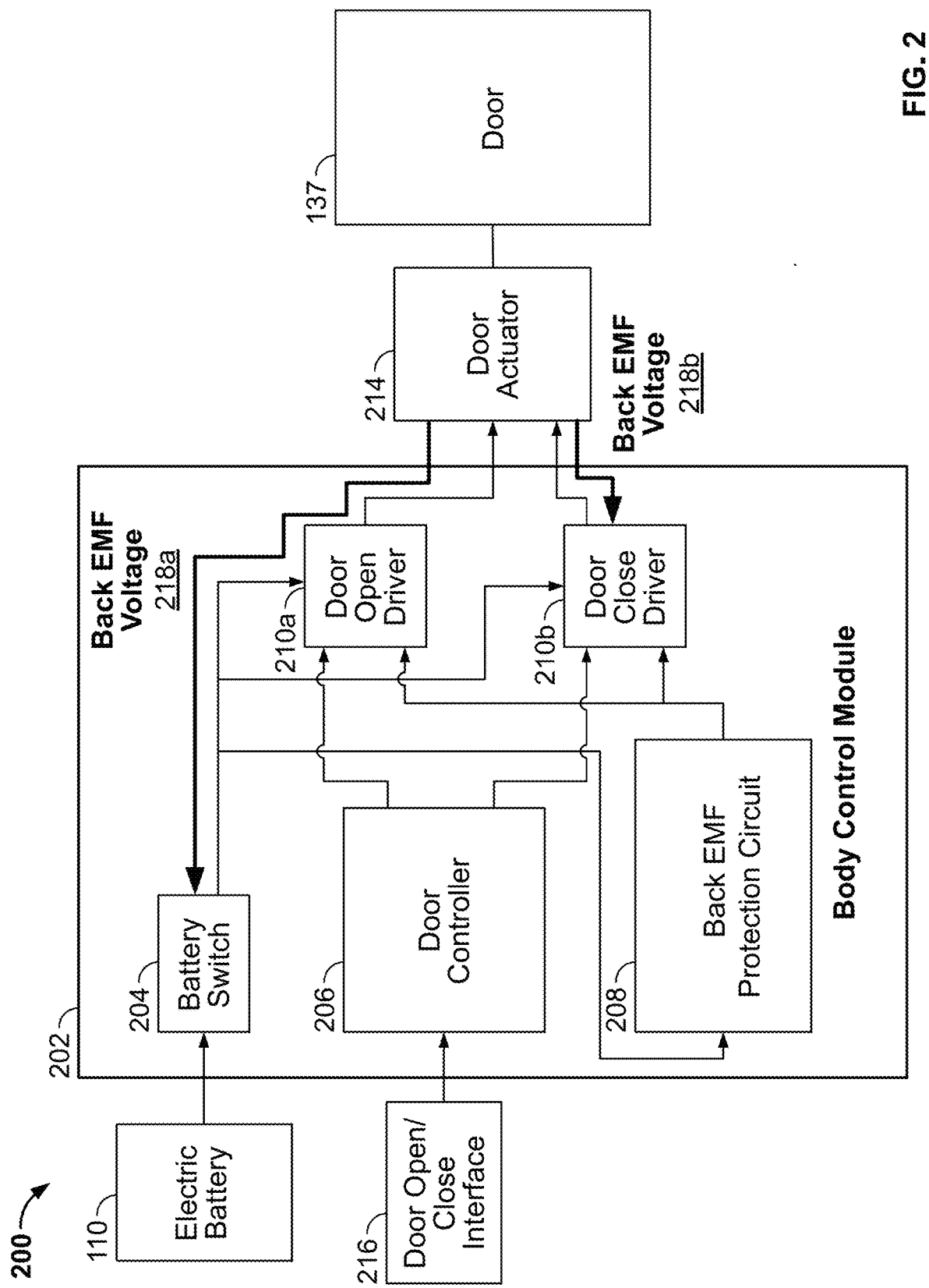
FIG. 2 shows a block diagram of an illustrative system for automatically opening and closing a door of a vehicle, in accordance with some embodiments of the present disclosure.

FIG. 2 shows a block diagram of illustrative system 200 for automatically opening and closing door 137 of vehicle 101, in accordance with some embodiments of the present disclosure. Components of system 200 may correspond to or be implemented by certain elements of system 100 illustrated in FIG. 1 (e.g., processing circuitry 102, battery system 108, output circuitry 120, door 137, etc.). As shown, system 200 includes body control module 202 configured to control different features of vehicle 101 (e.g., door lock/unlock, door open, automatic seat adjustment, etc.). Body control module 202 may comprise a printed circuit board (PCB) including a plurality of integrated circuit (IC) elements installed thereon for controlling the different vehicle features.

In some embodiments, body control module 202 is implemented by output circuitry 120 or by processing circuitry 102. As shown, body control module 202 includes a system for automatically opening and closing door 137 of vehicle 101. In one example, door 137 is a door to a frunk. In other examples, door 137 is another door of the vehicle (e.g., passenger door, driver door, tailgate, trunk door, etc.). Although a door is described, it should be understood that system 200 may be used to control any element that is moved by a linear actuator (e.g., a camp kitchen configured to be moved in and out of a gear tunnel) that is also able to be manually moved by a user.

As shown, system 200 includes door controller 206 configured to control door open driver 210a and door close driver 210b (collectively referred to as door drivers 210), which independently drive door actuator 214 (e.g., linear actuator) to open or close door 137. In some embodiments, a user may use door open/close interface 216 to automatically open or close door 137. As explained in greater detail in FIG. 3, each door driver 210 may include a half-bridge converter. Although only two door drivers are shown, it should be understood that additional door drivers may be used to drive door 137 or other doors of vehicle 101 (e.g., four door drivers may be used to drive the same door—e.g., left and right-side door drivers). Additionally, in some embodiments, a single door driver may be used to drive door 137 (e.g., to open or close the door). System 200 may further include back EMF protection circuit 208 to protect system 200 from damage by a back EMF voltage (e.g., back EMF voltage 218a, back EMF voltage 218b).

For example, when vehicle 101 is in an off or a standby state (e.g., battery switch 204 is switched off), both door drivers 210 may be turned off (e.g., electric battery 110 may be disconnected from door open driver 210a and door close driver 210b). For example, in some embodiments, as explained in greater detail with reference to FIG. 3, each door driver 210 may be disabled by inputting a low signal to an inhibit pin (e.g., INH pin 328 of FIG. 3) of each door driver 210 (e.g., tying the inhibit pin to ground). In this state (e.g., an off or sleep state), if a user manually closes door 137, a back EMF voltage (e.g., back EMF voltage 218a and back EMF voltage 218b, which are collectively referred to as back EMF voltage 218) may be generated by door actuator 214. Depending on how quickly the user manually closes door 137, back EMF voltage 218 may be large enough to damage door drivers 210, door controller 206, or other IC chips included in body control module 202. In order to prevent damage to components of body control module 202, back EMF protection circuit 208 may enable door drivers 210 in response to determining that back EMF voltage 218 exceeds an overvoltage threshold level (e.g., 18V), so that door drivers 210 may short back EMF voltage 218 to ground, as explained in greater detail below.

Figure 3:
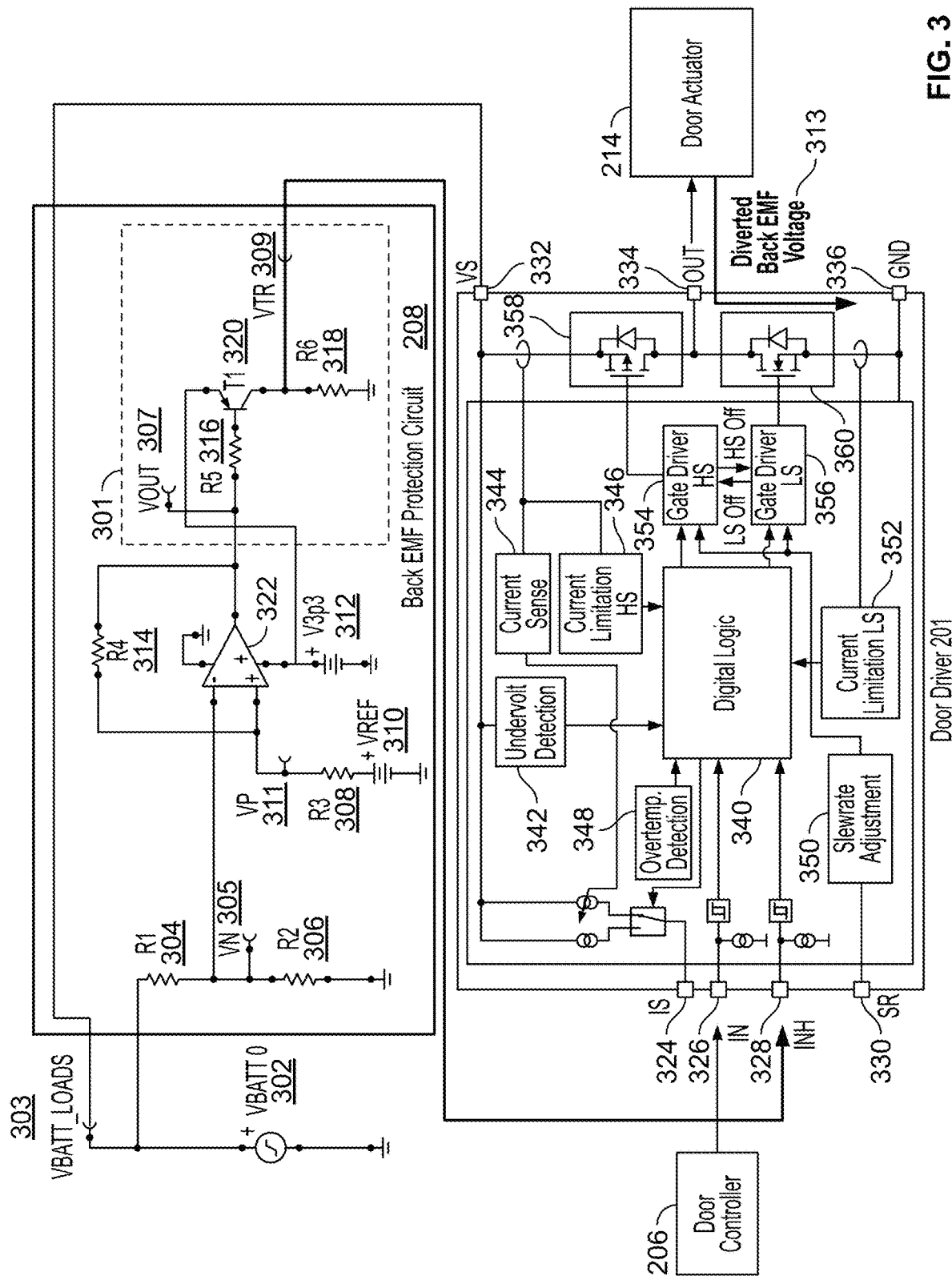
FIG. 3 shows a detailed block diagram of an illustrative back EMF protection circuit and door driver 210 for diverting a back EMF voltage generated by a door actuator, in accordance with some embodiments of the present disclosure.

FIG. 3 shows a detailed block diagram of illustrative back EMF protection circuit 208 and door driver 210 (e.g., door open driver 210a or door close driver 210b of FIG. 2) for diverting a back EMF voltage generated by door actuator 214, in accordance with some embodiments of the present disclosure. In some embodiments, back EMF protection circuit 208 and door driver 210 may be implemented on the same PCB (e.g., of body control module 202).

Door driver 210 may be a half-bridge integrated circuit (IC) configured to drive door actuator 214, based on a control signal from door controller 206. As shown, door driver 210 includes high-side switch 358 (e.g., a p-channel MOSFET) and low-side switch 360 (e.g., an n-channel MOSFET), and various other suitable circuitry and digital logic for driving the half-bridge IC and for protecting door driver 210. For example, as shown, door driver 210 may include digital logic 340 configured to control gate driver HS 354 to drive high-side switch 358 and to control gate driver LS 356 to drive low-side switch 360. Door driver 210 may further include current sense circuit 344 to detect an output current, current limitation high-side (HS) circuit 346 and current limitation low-side (LS) circuit 352 to detect high current conditions and short circuit conditions, undervolt detection circuit 342 to detect low voltage conditions (e.g., when the supply voltage falls below a threshold), and overtemp detection circuitry 348 to detect high temperatures (e.g., when the temperature exceeds a threshold). Digital logic 340 may shut down door driver 210 or stop operation of the half-bridge IC when abnormal operation is detected (e.g., high temperature, low voltage, high current, short circuit, etc.). Door driver 210 may also include slew rate adjustment circuit 350 for adjusting a slew rate of the half-bridge. Door driver 210 includes a plurality of input and output pins for controlling the operation of door driver 210. For example, as shown, door driver 210 includes IS pin 324 configured to receive a signal for current sense and diagnostics, IN pin 326 configured to receive a signal from door controller 206 (e.g., that defines whether high-side switch 358 or low-side switch 360 is activated), INH pin 328 configured to receive an inhibit signal (e.g., $V_{TR}$ 309) from back EMF protection circuit 208 for enabling/disabling door driver 210, SR pin 330 configured to adjust the slew rate of door driver 210 (e.g., by connecting a resistor between SR pin 330 and ground, VS pin 332 tied to $V_{BATT}$ 302 (e.g., corresponding to the battery voltage supplied by electric battery 110), GND pin 336 configured to be connected to a ground, and OUT pin 334 configured to output a signal for driving door actuator 214.

In some embodiments, when door driver 210 is enabled (e.g., body control module 202 is active), door driver 210 is able to detect a back EMF voltage generated by door actuator 214 and switch the half-bridge to a switched-mode, error-detected state. In this state, digital logic 340 may control gate driver HS 354 to turn off high-side switch 358 and control gate driver LS 356 to turn ON low-side switch 360, thereby shorting the back EMF voltage (e.g., diverted back EMF voltage 313) through low-side switch 360 to ground, as shown. If, however, door driver 210 is not enabled when a back EMF voltage is generated, door driver 210 is not able to detect and divert the back EMF voltage, and components of body control module 202 may be damaged.

Accordingly, as shown, back EMF protection circuit 208 is provided to quickly enable the door driver 210 when a back EMF voltage exceeds a predetermined level, so that door driver 210 may act quickly to short the back EMF voltage to ground (e.g., diverted back EMF voltage 313), before the back EMF voltage damages components of body control module 202.

As shown, back EMF protection circuit 208 may include comparator 322 that compares voltage $V_N$ 305 with reference voltage $V_P$ 311 (e.g., $V_{REF}$ 310) and outputs a signal ($V_{TR}$ 309) (e.g., a comparison result signal) for enabling/disabling door driver 210 (e.g., a signal input to INH pin 328 of door driver 210), based on $V_{out}$ 307. When body control module 202 is active, $V_N$ 305 corresponds to $V_{BATT}$ 302. When body control module 202 is not active and no back EMF voltage exceeding a reference voltage (e.g., $V_{REF}$ 310) of comparator 322 is present at $V_N$ 305, INH pin 328 may be tied to low (e.g., PNP transistor $T_1$ 320 connected the output of comparator 322 is turned off) and door driver 210 is disabled. If, however, a back EMF voltage exceeds a threshold level (e.g., 18V), transistor $T_1$ 320 may switch on, tying INH pin 328 to high and enabling door driver 210. The threshold level may correspond to tolerances of components of body control module 202 (e.g., before being damaged). With door driver 210 enabled (e.g., with IN pin 326 set to low), door driver 210 is able to detect the back EMF voltage, switch the half-bridge to a switched-mode, error-detected state, and short the back EMF voltage (e.g., diverted back EMF voltage 313) through low-side switch 360 to ground, as detailed above.

Back EMF protection circuit 208 may include circuitry for implementing the functions described above and below. For example, back EMF protection circuit 208 may include resistors $R_1$ 304, $R_2$ 306, $R_3$ 308, $R_4$ 314, $R_5$ 316, $R_6$ 318, comparator 322, transistor $T_1$ 320, etc., in the shown arrangement. In one embodiment, $R_1$ 304 is 140 kΩ, $R_2$ 306 is 10 kΩ, $R_3$ 308 is 10 kΩ, $R_4$ 314 is 402 kΩ, $R_5$ 316 is 1 kΩ, $R_6$ 318 is 10 kΩ, $V_{REF}$ 310 is 1.24V (e.g., corresponding to the internal voltage of comparator 322), and $V_{3p3}$ 312 is 3.3V. However, this is only one example, and it should be understood that any suitable circuit for implementing the functions described above and below may be utilized.

Although only a single door driver (door driver 210) is shown, back EMF protection circuit 208 may output an enable signal to all door drivers included in vehicle 101, in response to detecting a back EMF voltage exceeding a threshold level (e.g., 18V). For example, when vehicle 101 includes four door drivers (e.g., left door open driver, left door close driver, right door open driver, right door close driver), output circuitry 301 of FIG. 3 may be replaced with output circuitry 401 of FIG. 4, in order to output an enable signal to the INH pin (e.g., INH pin 328) of each of the four door drivers (e.g., door driver 210).

Figure 4:
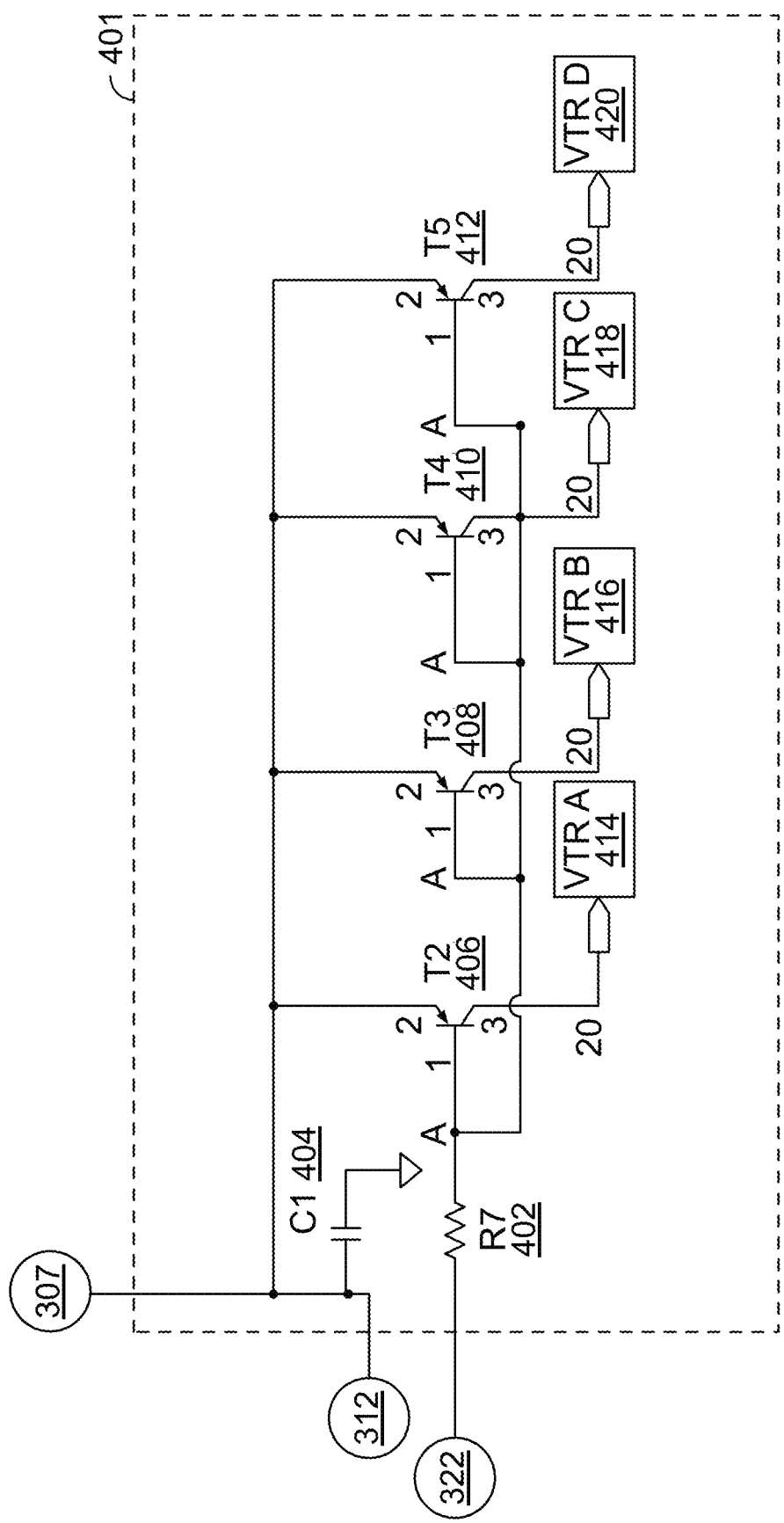
FIG. 4 shows example output circuitry for outputting an enable signal to four door drivers, in accordance with some embodiments of the present disclosure.

FIG. 4 shows example output circuitry 401 for outputting an enable signal to four door drivers, in accordance with some embodiments of the present disclosure. As shown, output circuitry 401 includes resistor $R_7$ 402, capacitor $C_1$ 404, and transistors $T_2$ 406, $T_3$ 408, $T_4$ 410, and $T_5$ 412. As described above, when a back EMF voltage exceeds a threshold level (e.g., 18V), signals (e.g., $V_{TR}$ A 414, $V_{TR}$ B 416, $V_{TR}$ C 418, $V_{TR}$ D 420) may be output to the INH pins of each of the four door drivers to enable the door drivers. It should be understood that any suitable circuit 401 for implementing the functions described above and below may be utilized. Additionally, although output circuitry 401 is configured to be connected to four door drivers, it should be understood that output circuitry 401 may be modified to connect to any suitable number of door drivers.

Figure 5:
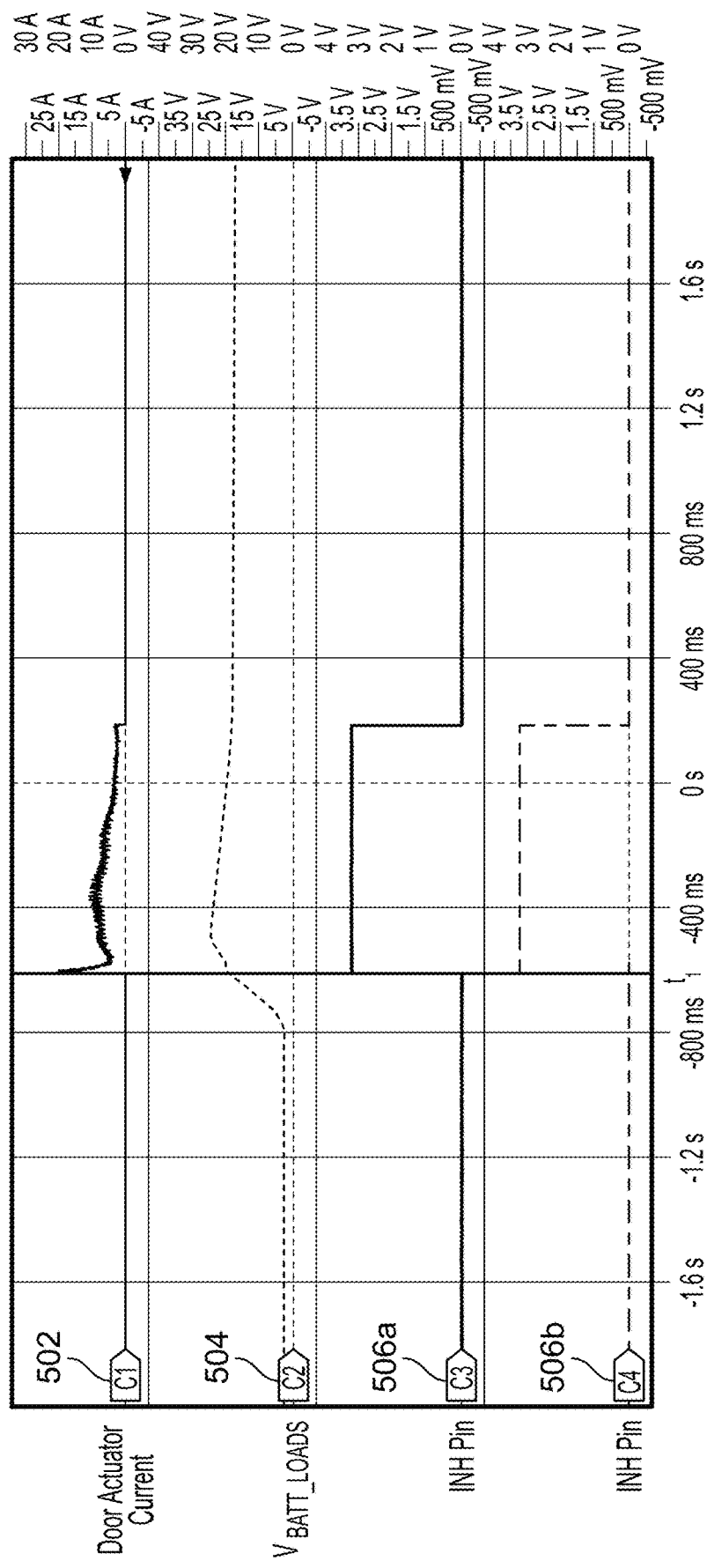
FIG. 5 shows example waveforms during operation of a back EMF protection circuit, in accordance with some embodiments of the present disclosure.

FIG. 5 shows example waveforms during operation of back EMF protection circuit 208, in accordance with some embodiments of the present disclosure. As described above with reference to FIG. 3, when the internal reference voltage (e.g., $V_{REF}$ 310) of comparator 322 is set to 1.24V, the output (e.g., $V_{OUT}$ 307) of comparator 322 will pull low for nominal $V_{BATT}$ LOADS 303 below 18V (i.e., back EMF voltages caused by a user manually closing or opening door 137 slowly) and door driver 210 will remain in an off state. However, if $V_{BATT}$ LOADS 303 exceeds 18V, comparator 322 will turn on transistor $T_1$ 320 and enable any connected door drivers 210 (e.g., by tying INH pin 328 to high). For example, as shown in the illustrated fault condition of FIG. 5, when a user quickly closes or opens door 137, door actuator current 502 is generated by the door actuator coupled to door 137 (e.g., door actuator 214 of FIG. 2). Door actuator current 502 causes a back EMF voltage (e.g., back EMF voltage 218 of FIG. 2) to be generated, as shown by $V_{BATT\_LOADS}$ 504 ($V_{BATT\_LOADS}$ 504 may correspond to $V_{BATT\_LOADS}$ 303 of FIG. 3). Once $V_{BATT\_LOADS}$ 504 exceeds a threshold voltage (e.g., 18V) at time $t_1$, the INH pin (e.g., INH pin 506a and INH pin 506b) of each of the connected door drivers (e.g., door open driver 210a and door close driver 210b) transitions from low to high, enabling each door driver 210, such that each door driver 210 is able to short the back EMF voltage through their respective low-side switch (e.g., low-side switch 360) to ground, as detailed above. As shown, once $V_{BATT\_LOADS}$ 504 drops below the threshold voltage, INH pin 506a and INH pin 506b transition from high back to low.

Figure 6:
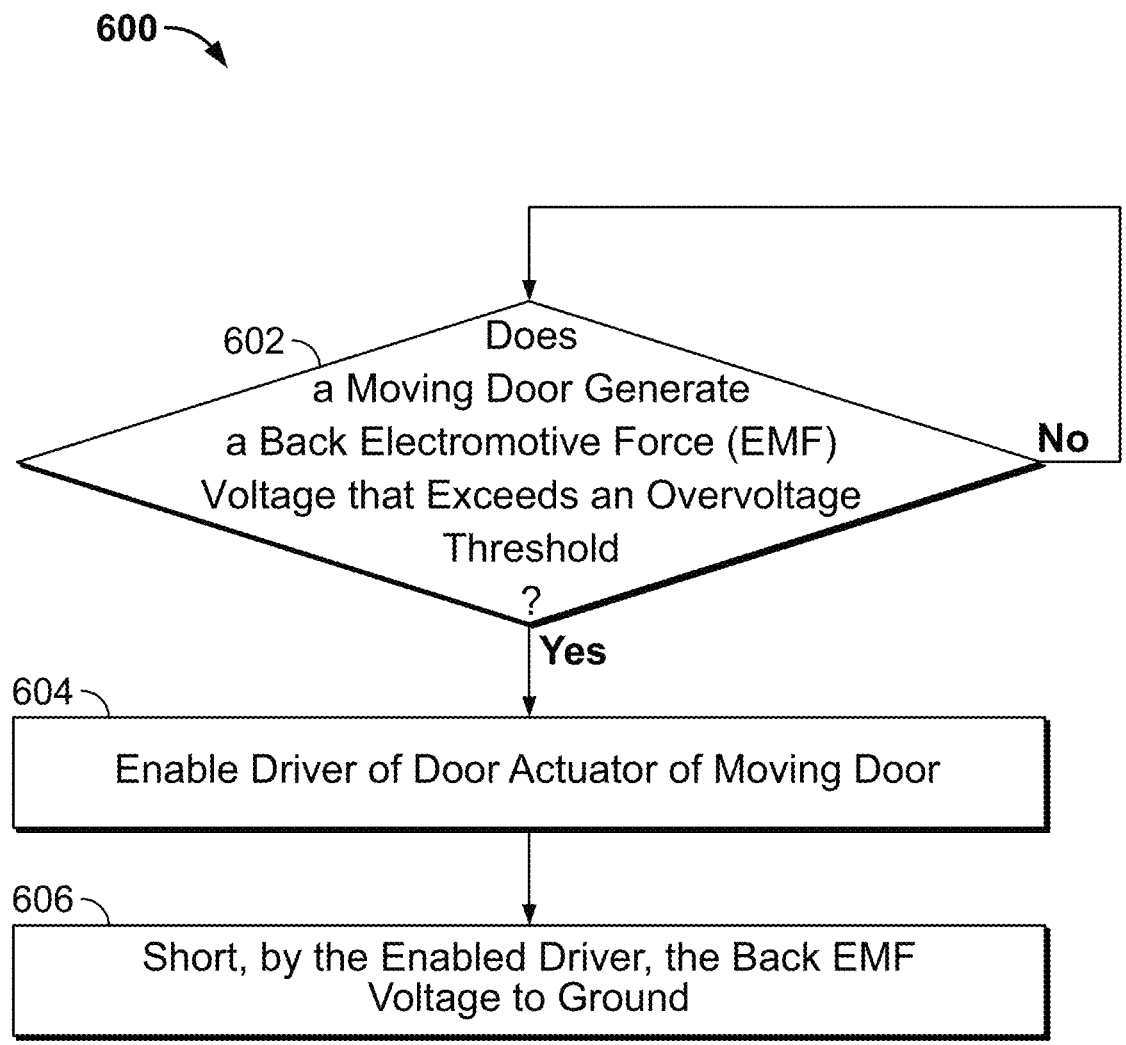
FIG. 6 shows a flowchart of an illustrative process for shorting a back EMF voltage to ground, in accordance with some embodiments of the present disclosure.

FIG. 6 shows a flowchart of illustrative process 600 for shorting a back EMF voltage to ground, in accordance with some embodiments of the present disclosure. Process 600 may be performed at least in part by door drivers 210 and back EMF protection circuit 208 of body control module 202 of system 200 of FIG. 2.

At 602, back EMF protection circuit 208 may determine whether an automatic door (e.g., door 137) generates a back EMF voltage that exceeds an overvoltage threshold when body control module 202 is off (or in sleep mode) (e.g., not enabled). For example, back EMF protection circuit 208 may determine if the back EMF voltage exceeds 18V. In response to determining that the back EMF voltage does exceed 18V ("Yes" at 602), process 600 proceeds to 604. Otherwise, back EMF protection circuit 208 remains at 602 and continues to monitor for any back EMF voltages.

At 604, in response to determining that the back EMF voltage does exceed 18V, back EMF protection circuit 208 enables the driver (or drivers) of the moving door (e.g., door 137). For example, back EMF protection circuit 208 transitions the INH pin (e.g., INH pin 328) of the driver (e.g., driver 210) from low to high.

At 606, the enabled driver (e.g., driver 210) shorts the back EMF voltage to ground through the low-side switch (e.g., through low-side switch 360). Once the back EMF voltage drops below the threshold level, back EMF protection circuit 208 transitions the INH pin (e.g., INH pin 328) of the driver (e.g., driver 210) from high back to low.

The processes discussed above are intended to be illustrative and not limiting. One skilled in the art would appreciate that the steps of the processes discussed herein may be omitted, modified, combined and/or rearranged, and any additional steps may be performed without departing from the scope of the invention.

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A system comprising:
a first driver configured to drive a door actuator to open a door;
a second driver configured to drive the door actuator to close the door;
a door controller configured to:
cause the first driver to open the door, and
cause the second driver to close the door; and
a back electromotive force (EMF) protection circuit configured to:
while the door controller is not enabled:
detect a back EMF voltage generated by the door actuator when the door is moved;
determine whether the back EMF voltage exceeds an overvoltage threshold; and
in response to determining that the back EMF voltage exceeds the overvoltage threshold, transition an inhibit (INH) pin of each of the first driver and second driver to cause each of the first and second drivers to transition to an enabled state to short the back EMF voltage to ground.

2. The system of claim 1, wherein:
each respective driver of the first driver and the second driver is a half-bridge integrated circuit (IC) comprising a high-side switch and a low-side switch; and
each respective driver is further configured, when in the enabled state, to short the back EMF voltage at an output of each respective driver to ground through the respective low-side switch.

3. The system of claim 2, wherein each respective driver of the first driver and the second driver is configured to short the back EMF voltage at the output of each respective driver to ground through the respective low-side switch, by switching on the respective low-side switch and switching off the respective high-side switch.

4. The system of claim 2, wherein each respective driver of the first driver and the second driver comprises a protection circuit configured to:
determine, when a respective driver is in the enabled state, whether the back EMF voltage exceeds a driver overvoltage level; and
in response to determining that the back EMF voltage exceeds a driver overvoltage level, short the back EMF voltage at the output of the respective driver to ground through the respective low-side switch, by switching on the respective low-side switch and switching off the respective high-side switch.

5. The system of claim 3, wherein the back EMF protection circuit is configured, when causing each of the first and second drivers to transition to the enabled state, to transition the inhibit (INH) pin of the half-bridge IC of each of the first and second drivers from low to high.

6. The system of claim 5, further comprising a body control module comprising a printed circuit board (PCB), wherein the half-bridge IC of each of the first and second drivers and the back EMF protection circuit are installed on the PCB.

7. The system of claim 1, wherein:
the door is installed on a frunk; and
the back EMF voltage is generated by the door actuator when the door to the frunk is opened or closed.

8. The system of claim 1, wherein the back EMF protection circuit comprises a comparator configured to compare the back EMF voltage with the overvoltage threshold and output a comparison result signal to a first transistor, and wherein when the back EMF voltage exceeds the overvoltage threshold, the comparison result signal causes the first transistor to turn on and transition the inhibit (INH) pin of each of the first driver and the second driver from low to high to cause each of the first and second drivers to transition to the enabled state.

9. A method comprising:
while a door controller, configured to cause a first driver to open a vehicle door and configured to cause a second driver to close the vehicle door, is not enabled:
detecting, by a back electromotive force (EMF) protection circuit, a back EMF voltage generated by movement of a door actuator, wherein the door actuator is coupled to the vehicle door;
determining whether the back EMF voltage exceeds an overvoltage threshold; and
in response to determining that the back EMF voltage exceeds the overvoltage threshold, transitioning an inhibit (INH) pin of each of the first driver and the second driver, each associated with the door actuator, causing a transition of each of the first and second drivers from a disabled state to an enabled state, wherein the enabled state of each of the first and second drivers causes the back EMF voltage to short to ground.

10. The method of claim 9, wherein:
each respective driver of the first driver and the second driver is a half-bridge integrated circuit (IC) comprising a high-side switch and a low-side switch, and the enabled state of each respective driver causes the back EMF voltage to short to ground by shorting the back EMF voltage at an output of each respective driver to ground through the respective low-side switch.

11. The method of claim 10, wherein the enabled state of each respective driver causes the back EMF voltage to short to ground by switching on the respective low-side switch and switching off the respective high-side switch.

12. The method of claim 10, further comprising:
determining, by a respective enabled driver, whether the back EMF voltage exceeds a driver overvoltage level; and
in response to determining that the back EMF voltage exceeds a driver overvoltage level, shorting, by the respective driver in the enabled state, the back EMF voltage at the output of the respective driver to ground through the respective low-side switch, by switching on the respective low-side switch and switching off the respective high-side switch.

13. The method of claim 10, wherein causing the transition of each of the first and second drivers associated with the door actuator from the disabled state to the enabled state comprises transitioning the inhibit (INH) pin of the half-bridge IC of each of the first and second drivers from low to high.

14. The method of claim 9, wherein the door is installed on a frunk, and the back EMF voltage is generated by the door actuator when the door to the frunk is opened or closed.

15. The method of claim 9, wherein:
determining whether the back EMF voltage exceeds the overvoltage threshold comprises comparing the back EMF voltage with the overvoltage threshold; and
causing the transition of each of the first and second drivers associated with the door actuator from the disabled state to the enabled state comprises outputting a comparison result signal of the comparing to a first transistor that causes the first transistor to turn on and transition the inhibit (INH) pin of each of the first driver and the second driver from low to high.

16. A vehicle comprising:
a vehicle body comprising an enclosure;
a door coupled to the vehicle body and configured to provide access to the enclosure;
a first driver configured to drive a door actuator to open the door;
a second driver configured to drive the door actuator to close the door;
a door controller configured to:
cause the first driver to open the door, and
cause the second driver to close the door; and
a back electromotive force (EMF) protection circuit configured to:
while the door controller is not enabled:
detect a back EMF voltage generated by the door actuator when the door is moved;
determine whether the back EMF voltage exceeds an overvoltage threshold; and
in response to determining that the back EMF voltage exceeds the overvoltage threshold, transition an inhibit (INH) pin of each of the first driver and second driver to cause each of the first and second drivers to transition to an enabled state to short the back EMF voltage to ground.

17. The vehicle of claim 16, wherein the enclosure is a frunk.

18. The vehicle of claim 16, wherein:
each respective driver of the first driver and the second driver is a half-bridge integrated circuit (IC) comprising a high-side switch and a low-side switch; and
each respective driver is further configured, when in the enabled state, to short the back EMF voltage at an output of each respective driver to ground through the respective low-side switch.

19. The vehicle of claim 18, wherein each respective driver of the first driver and the second driver is configured to short the back EMF voltage at the output of each respective driver to ground through the respective low-side switch, by switching on the respective low-side switch and switching off the respective high-side switch.

* * * * *